United States Patent [19]

Caesar

[11] 4,253,853
[45] * Mar. 3, 1981

[54] CONTACTOR AND ENTRAINMENT SEPARATOR

[75] Inventor: Michael B. Caesar, Lake City, Fla.

[73] Assignee: Occidental Research Corporation, Irvine, Calif.

[ * ] Notice: The portion of the term of this patent subsequent to Aug. 14, 1996, has been disclaimed.

[21] Appl. No.: 85,345

[22] Filed: Oct. 16, 1979

Related U.S. Application Data

[63] Continuation of Ser. No. 909,895, May 5, 1978, abandoned.

[51] Int. Cl.$^3$ ............................................. B01D 45/08
[52] U.S. Cl. ..................................... 55/226; 55/240; 55/242; 55/257 NP
[58] Field of Search ............... 261/DIG. 54, DIG. 56, 261/116, DIG. 9; 55/223, 226, 186, 240, 241, 242, 244, 355, 257 NP

[56] References Cited

U.S. PATENT DOCUMENTS

| | | | |
|---|---|---|---|
| 1,970,783 | 8/1934 | Walker | 55/186 |
| 2,489,370 | 11/1949 | Fowler | 55/186 |
| 3,317,197 | 5/1967 | Lohner et al. | 261/DIG. 54 |
| 3,406,499 | 10/1968 | Wiemer | 261/DIG. 54 |
| 3,699,748 | 10/1972 | Barkovitz | 55/223 |
| 3,750,375 | 8/1973 | Wintrell | 261/DIG. 54 |
| 3,802,161 | 4/1974 | Talbert | 55/226 |
| 3,820,307 | 6/1974 | Hausberg et al. | 55/226 |
| 3,877,488 | 4/1975 | Baturay et al. | 261/DIG. 54 |
| 3,988,421 | 10/1976 | Rinaldi | 261/DIG. 54 |
| 3,994,705 | 11/1976 | Przewalski | 55/226 |
| 4,057,602 | 11/1977 | Kolm | 55/226 |
| 4,144,041 | 3/1979 | Hou | 55/226 |
| 4,164,398 | 8/1979 | Caesar | 55/186 |

Primary Examiner—Frank W. Lutter
Assistant Examiner—Gregory N. Clements
Attorney, Agent, or Firm—Barry A. Bisson; Walter A. Hackler

[57] ABSTRACT

A contactor for liquids with gases, solids or liquids which can also serve as an entrainment separator for separating liquids from gases and solids from gases, includes a housing providing an inlet at one end and an outlet at the opposed end, means to introduce a mist or spray of liquid and positioned between said inlet and an adjustable surface (preferably planar) providing a face facing the inlet and the means for introducing said liquid, and an opposed face, an annular deflector beneath the planar surface attached to the housing and extending inward of the housing and positioned relative to the planar surface to provide an opening between the planar surface and annular deflector, means to adjust the position of the planar surface relative to the annular deflector, a tube attached to the opposed face of the planar surface and extending downward of the inlet, a funnel providing a downward extending spout positioned below the tube, means providing flow of liquid in the funnel past the tube and to the spout, and a gas outlet extending through the side of the housing.

12 Claims, 5 Drawing Figures

CONTACTOR AND ENTRAINMENT SEPARATOR

CROSS-REFERENCE TO RELATED APPLICATION

This application is a continuation of U.S. application Ser. No. 909,895 filed May 5, 1978, now abandoned.

BACKGROUND OF THE INVENTION

The present invention relates to an entrainment separator. More particularly, it relates to an entrainment separator for the separation of entrained solids or liquids from gases, preferably entrained liquids. It also relates for a contactor-separator wherenby a mist or drops of a liquid can be contacted with the gaseous stream to further remove entrained liquids, solids and/or soluble or reactive components of the gaseous stream (e.g., $SO_2$ removal by a caustic wash).

It has been well known that dispersions of liquids in gases and gases in liquids are always fundamentally unstable mixtures. Left to themselves, they will generally separate into massive collections of the component phases. In many instances, however, such natural separation occurs over a long period of time. For industrial uses and independent of origin of the dispersion, whether intentional or inadvertent, the gas-liquid dispersions generally are always ultimately separated. The separation may consist merely of removal of the aggregated and collected phases, or it may involve aggregation and collection as well as removal. Often the rate at which the process of separation would occur naturally is slow and uneconomical. In such cases the separation operation may be enhanced by the artificial acceleration of the natural process.

There are many reasons why gas-liquid dispersions should be separated. The quality of a process stream or of a product can suffer unless adulterating material in the form of another dispersed phase is removed. The efficiency of staged mass transfer operations can be reduced if there is mechanical carryover of a dispersed phase with the continuous stream from one stage to the next. Valuable material can be lost from a system because of incomplete separation of dispersed material. With improper separation of the gas-liquid dispersion, there can be intrusion of an unwanted phase into equipment along the line of processing which may result in poort performance or damage to the equipment. A discharge of a gas-liquid dispersion from a stack can result in atmospheric pollution and possible destruction of property.

Many methods are employed to separate gas-liquid dispersion systems. Such methods include: gravitational, inertial, absorption, dilution, physicochemical, electrical, and thermal. Often more than one method is effective and the methods may be combined for synergistic effect. Many separators employing the above systems and procedures are the product of invention or accumulated experience and have never been completely described scientifically. Many such methods and apparatus for separating entrained liquids from gases are designed specifically for the conditions peculiar to a given gas-liquid dispersion system and the mechanical apparatus also peculiar to that system.

SUMMARY OF THE INVENTION

In accordance with this invention, there is disclosed a combination liquid-gas contactor and entrainment separator comprising:

a housing having inlet means for introducing a flow of gas into said housing, first outlet means for withdrawing liquids and solids, separated from said gas, from said housing, and second outlet means for withdrawing gas, substantially free of entrained liquids and solids, from said housing, said inlet means and said first outlet means being disposed in opposite ends of said housing, said second outlet means being disposed in said housing intermediate said inlet and first outlet means;

spray means for injecting a liquid mist into said housing, said spray means being configured and positioned for contacting said liquid mist with the gas introduced into the housing;

a member having means defining a first surface for intercepting both the flow of gas introduced by the inlet means and the liquid mist injected by the spray means, and a second surface opposite said first surface;

a tube disposed within said housing and extending away from said second surface;

annular deflector means disposed adjacent to the member, attached to the housing and extending inward of the housing and positioned relative to the first surface to provide an opening therebetween, said deflector means being operative for directing the gas flow toward said tube;

means for adjusting the position of the member relative to the annular deflector means, thereby varying the size of said opening; and, funnel means at least partly surrounding said tube for conducting flow of liquids and solids separated from the gas into said second outlet means.

The advantages of the invention include the following:

1. The adjustment feature allows a wide turndown ratio, even during operation if the external adjustment is included.
2. Easily cleaned after removal of internals.
3. Small positive flow of gas assists in keeping the separated liquid or gas particles moving toward the drain outlet.
4. In the (favored) downward flow configuration the direction of gas flow assists the gravitational drainage down the wall of the impingement cylinder and prevents reentrainment.
5. The cylindrical configuration of the housing is the least expensive for pressure or vacuum application, and is well suited for lining against corrosion, erosion, etc.
6. The housing can be fabricated from standard piping or vessel sections, while the intervals can be sized for particular applications.

This separator and condensor, U.S. Ser. No. 909,895 filed May 26, 1978 is the subject of my co-pending application titled "ENTRAINMENT SEPARATOR", the entire disclosure of which is hereby incorporated herein. In the present invention, there are incorporated in the separator means of introducing therein a mist or spray of liquid to enable the device to also operate as a contactor.

DRAWINGS

These and other features and advantages of the present invention will be appreciated as the same becomes better understood by reference to the following detailed description and accompanying drawings, which are (FIGS. 1,2,3 and 5) longitudinal cross-sectional views through preferred embodiments of the contactor and entrainment separator and (FIG. 4) a detail of a preferred adjustment means.

DETAILED DESCRIPTION

Figure 1:
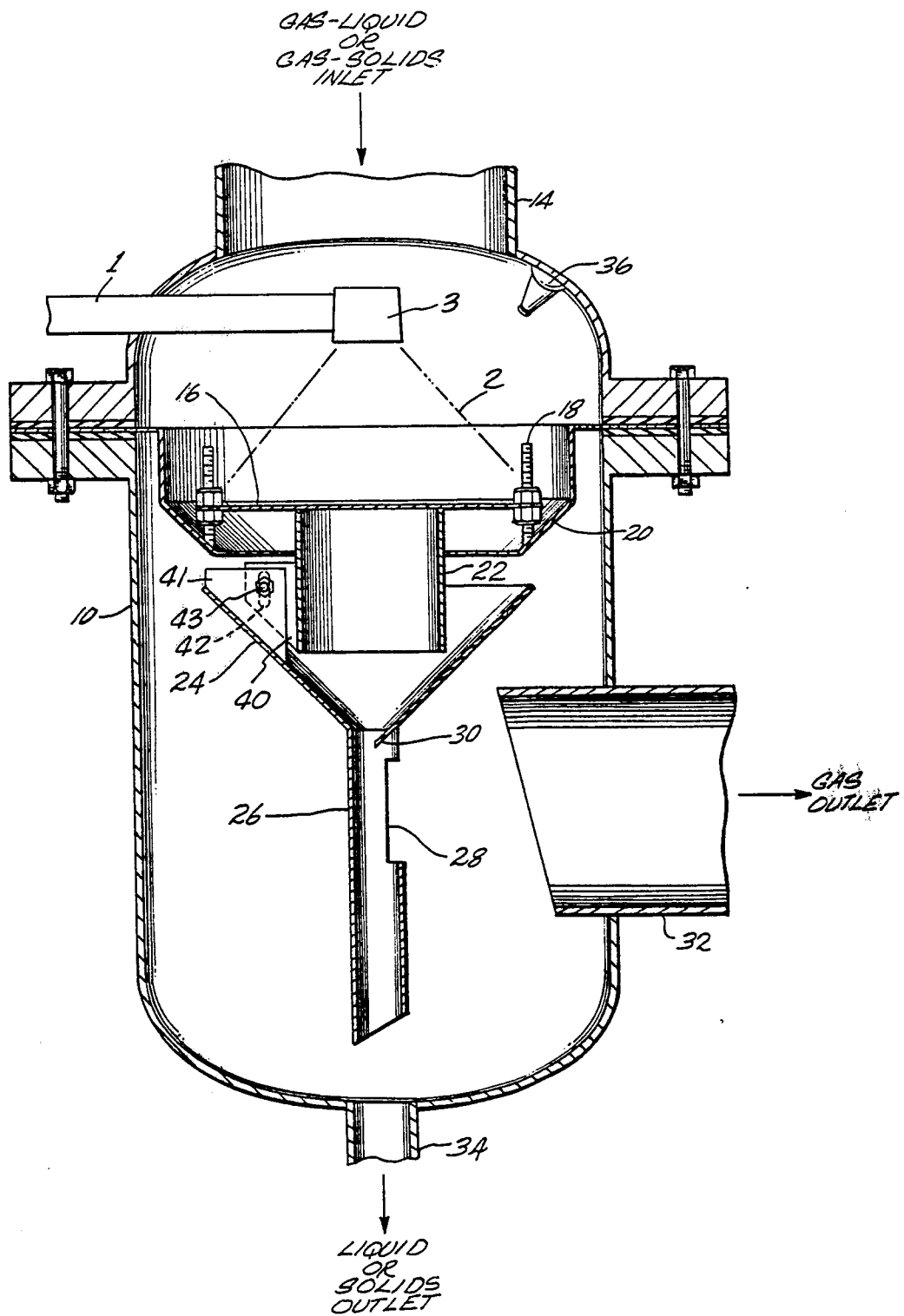

With reference to FIG. 1 of the drawing, the contactor and entrainment separator comprise a housing 10. Positioned on housing 10 is removable cover 12 having an inlet 14. Positioned directly below and in line with inlet 14 is planer surface 16 which forms a plane perpendicular to the plane defined by the sides of inlet 14. Planar surface 16 has a face directed toward inlet 14 and an opposed face. Planar surface 16 is positioned in proximity to and lying within a concave cavity formed by annular deflector 20 which is attached to housing 10. Annular deflector 20 attached to housing 10 extends, generally, downward and inward of the housing. The slope inward of annular deflector 20 is from about 15° to about 75° from vertical. It is preferred that the annular deflector have an inward slope of from about 30° to about 60°. Planar surface 16 has adjustment means 18 by which the position of the planar surface is adjusted in relation to annular deflector 20. An opening between planar surface 16 and annular deflector 20 is defined by the edge of the planar surface 16 and annular deflector 20. By adjusting the adjustment means 18, the width of the opening is correspondingly adjusted.

Positioned above the adjustable surface 16, and below the inlet 14, is a spray boom 1 which can introduce a spray of liquid droplets or a mist which can provide intimate contact of a wash liquid (e.g., water) or a reagent (e.g., aqueous base to react with acidic gases) with the fluid entering through the inlet.

The spray-head 3 could be directed upward toward the inlet 14 or, as illustrated, toward the adjustable surface 16.

Attached to the opposed face of planar surface 16 is tube 22. The sides of tube 22 are perpendicular to the plane of planar surface 16. Tube 22 extends downward from planar surface 16 into the mouth of funnel 24 lying directly below planar surface 16. Funnel 24 has a spout 26 extending downward toward the bottom of housing 10. Lying below spout 26 is a liquid or solids outlet 34. Spout 26 can have a lateral gas exhaust port 28. If spout 26 has a gas port 28, shield 30 is provided and positioned directly above gas port 28 and attached to funnel 24 to prevent liquid or solids from flowing through the opening. A gas outlet 32 is positioned on the side of housing 10, directly facing and in line with gas port 28. The entrainment separator of this invention is designed to separate liquids and solids from the gas in which they are entrained. Although the contactor and separator of the invention can be used to separate solid particles from gases, it is particularly suited to separate liquids from gases. It is preferable that the entrainment separator for separating solids from gases have washing means 36 for washing the solids, disengaged from the gas, from the surfaces on which they accumulate. Such washing means include a spray or series of spray nozzles, ring sprayers and the like, such surface washing means are to be distinguished from means of introducing a spray or mist to the interior of the upper volume of the device, thus permitting efficient contact of the spray or mist with a fluid stream comprising gases containing entrained solids and/or liquids.

The description of the contactor separator will be better understood by the following discussion of the flow of gas-liquid dispersion therethrough.

The gas-liquid dispersion to be separated enters in a downward flow into the entrainment separator housing 10 through inlet 14 located on cover 12. Cover 12 can be either fixed or removable. It has been found to be preferred to have the cover removable to facilitate inspection, cleaning, adjustment or repair of the separator.

The downward flowing gas-liquid dispersion strikes planar surface 16 which lies directly in the path of the dispersion flow. The planar surface diverts the flow of gas but the liquid entrained in the dispersion is impinged on the planar surface. The entrained liquid droplets in the dispersion are carried toward the planar surface by their large downward flowing momentum relative to the gas flow and the liquid droplets thereby impinge upon the planar surface. The gas continues to flow around the edges of the planar surface striking annular deflector 20. The annular deflector directs the gas through the opening between the planar surface and the annular deflector. Any liquid which remained in the gas after striking the planar surface is impinged onto the surface of the annular deflector. The gas passing through the opening between the planar surface and annular deflector is directed by the annular deflector into the sides of tube 22. Any liquid which still remains in the gas may also impinge or disengage from the gas by centrifugal force onto the surface of tube 22. The gas flow substantially continues around tube 22 toward gas outlet 32. However, some gas will strike funnel 24. Any liquid remaining in the gas striking the funnel can be impinged on the surface thereof. The flow of substantially liquid-free gas from the funnel and the tube continues due to the gas flow pressure striking the side of the housing whereupon remaining liquid is impinged or disengaged from the gas by centrifugal force and the gas then flows through gas-outlet 32 located on the side of housing 10.

Tube 22 has a plurality (e.g., 3 or 4) of slotted lug members (one of which 40 is shown in the figure) which corresponds with slotted lugs 41 on the cone 24 and permits vertical adjustment of the gap between cylinder 22 and cone 24. The adjustment is made such that the disengaged liquid can flow down cone 24 but not so great as to permit excess flow of air downward. The slots are shown as 42 in the figure. Clamping is achieved by bolt and nut, 43.

It is preferred that the gas-outlet 32 extend into the housing 10 to prevent re-entrainment of the liquid that collected on the interior wall of the housing as it flows down the wall toward the liquid outlet.

The flow of gas and the velocity thereof can be controlled by the adjustment means 18 located on planar surface 16. As recited above, the adjustment means positions planar surface 16 relative to annular deflector 20 and thereby controls the width of the opening between the planar surface and the annular deflector. The planar surface lies within the concave cavity of the annular deflector. By raising or lowering the planar surface, the opening is correspondingly widened or narrowed. Any convenient adjustment means can be used to adjust the planar surface such as bolt and nut, bolt with threaded aperture in the planar surface, slide fastener, and the like.

The liquid impinged on planar surface 16 collects on the surface until droplets of sufficient size are formed such that they begin to run off the planar surface. The drops of liquid fall off the edge of the planar surface striking annular deflector 20. The liquid flows down the annular deflector. The inner and lower edge of the annular deflector extends inward of housing 10 and over the mouth of funnel 24 lying below. The liquid that has run off the planar surface flows down the annular deflector collecting any liquid impinged thereon and drops into funnel 24. Liquid that is impinged on tube 22 likewise drops into funnel 24. Funnel 24 can be attached to the housing or can be attached to tube 22. Preferably, funnel 24 is attached to the tube or housing in such a manner that it can be readily removed to facilitate cleaning. It is preferred that the funnel be attached to the tube such that a gap of from about ⅛ to about ¼ inches is formed between the funnel and tube. Alternatively, the funnel can be attached to the lower end of the tube with slots provided in the tube to enable liquid to flow from the funnel to the spout. More preferably, the means of attachment of the funnel to the tube are adjustable to vary the gap within the desired range of about ⅛ to ¼ inches. The liquid collected in funnel 24 flows down spout 26 and drops out of the tip of the spout into liquid outlet 34 and out of housing 10 of the separator. Any liquid impinged on the side of the housing or outlet 32 runs off the surface of the outlet, down the side of the housing and out liquid outlet 34.

Figure 3:
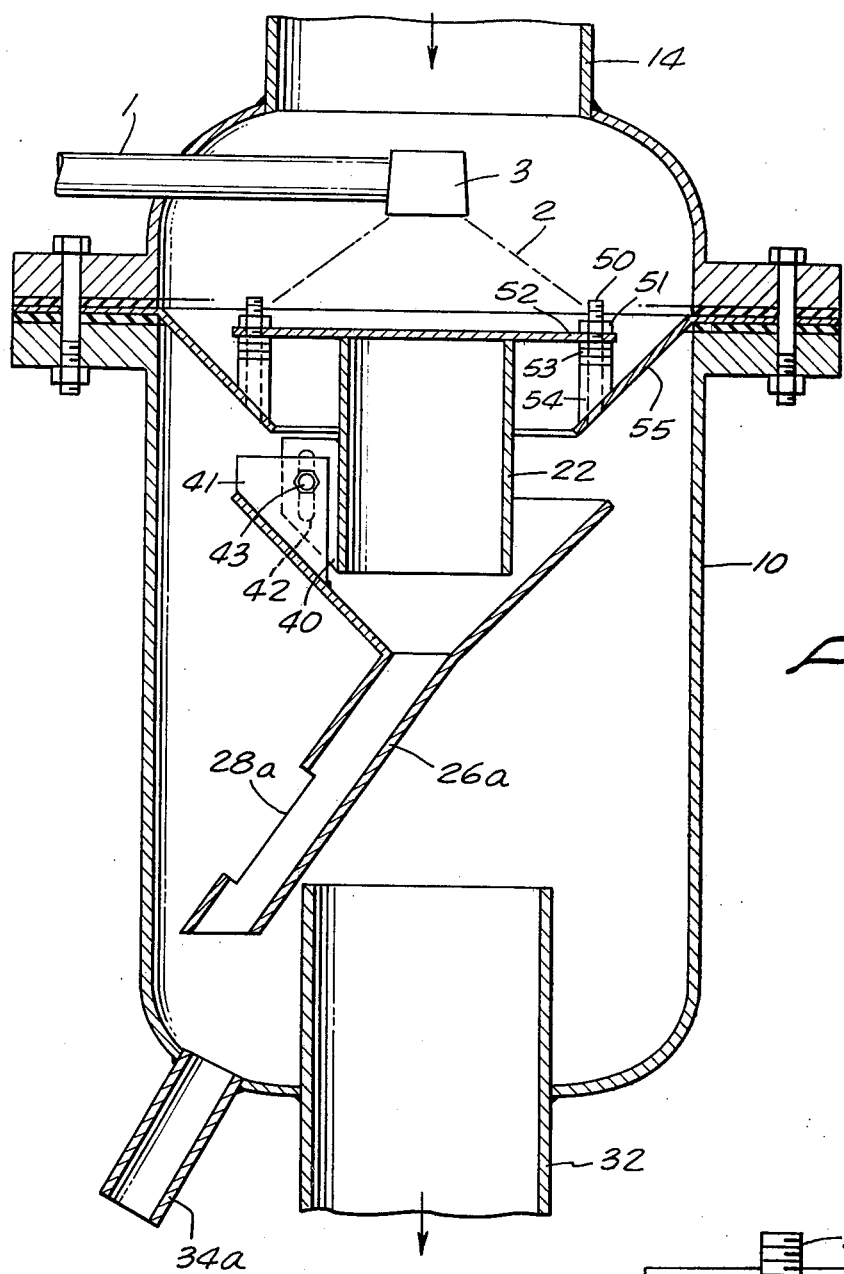
Figure 4:
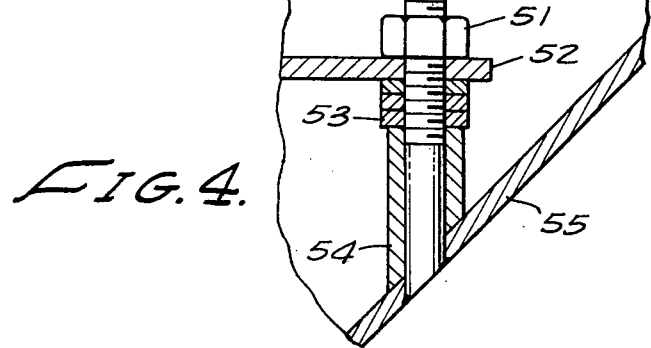

Generally, the gas will not substantially flow through the funnel because of the constriction between the mouth and spout of the funnel and because the gas is free to flow upward out of the funnel. However, a gas exhaust port 28 can be provided in spout 26 of funnel 24 to allow any gas passing down the spout a passageway out of the funnel. The gas port allows the gas to pass out of the spout rather than pass through the narrow spout at the same time as the liquid. The gas port provides a pathway of least resistance for gas out of the spout. The passage of the liquid down the spout is also enhanced by the availability of gas port 28. From gas port 28, the gas can flow directly to the gas outlet 32. Liquid is prevented from flowing out of the gas port by a shield 30 positioned over the gas port. The shield directs the flow of liquid away from the gas port. In the broadest sense, this device is a separator, and with means of adding a liquid mist or droplets, e.g. as when a spray boom (1) and nozzle (3) are inserted in the inlet, is a contactor/separator. Many arrangements of the basic design are possible, to fit in with a total system design e.g., 1. vertical (downwards) gas outlet, with the liquid drain and funnel drain skewed (see FIG. 3 attached). Thus, refering to to FIG. 3, the funnel spout or drain 26a containing the gas exhaust port 28a, and liquid outlet or drain 34a, are skewed. In FIGS. 3 and 4 the adjustment means for positioning the planar surface 52 with respect to the annular deflector 55 includes a plurality of units each comprising a bolt 50 and nut 51, the bolt being received within a sleeve 54 mounted on the deflector 55, with washers 53 positioned between the end of the sleeve and the lower face of planar surface 52.

2. it is possible to design for vertical upward inlet, with the top gas outlet either vertical or horizontal. In this configuration, the gravity flow tube from the funnel would need to be sealed into the liquid solid outlet nozzle and not have a gas port. The internals should be different from the downflow design.

Other changes from the original basic design include:

1. Omitting the vertical step below the main flange as noted earlier, if sideways removal of the top housing is not necessary. This also shortens the housing.

Figure 2:
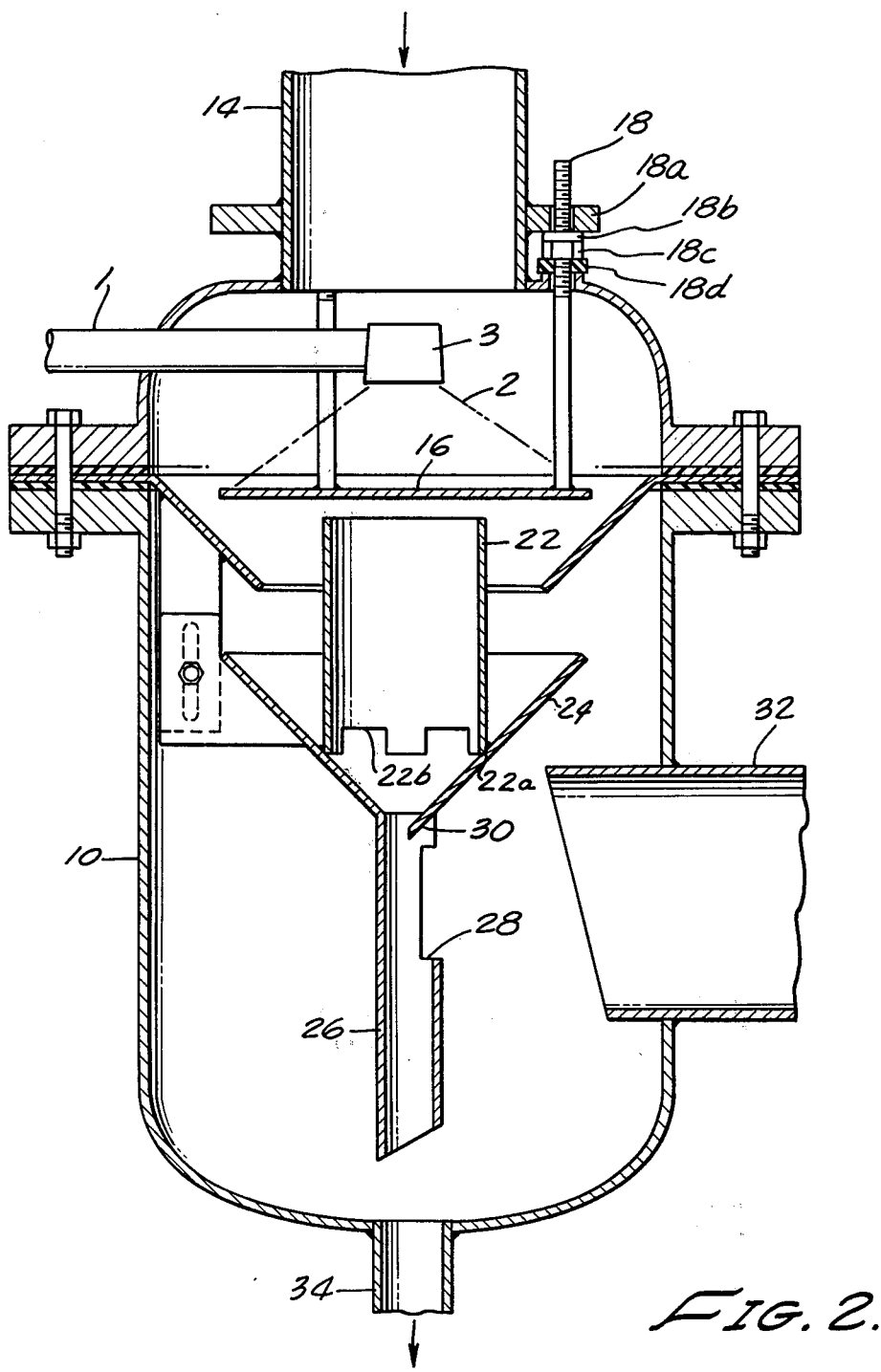

2. Extending the adjusting bolts (item 18) out through the top of the upper housing, to permit adjustment while in operation. This requires the planar surface to be separate from the other intervals (see FIG. 2) and the impingement cylinder (item 22) would be attached to the cone (item 24) with drainage slots at the base.

3. Extending the inlet pipe (14) into the top housing so that its clearance above the planar surface gives a much higher velocity than at present. This would limit the adjustment of the planar surface.

4. Install a hollow cone nozzle in the upper housing, to provide a continuous spray of liquid. This would make the equipment into a contactor/separator, for such uses as scrubbing, humidifying, desuperheating (see FIGS. 1, 2 & 3).

The contactor-separator can also function as a mist-type chemical reactor see the patents of Jaydee W. Miller U.S. Pat. Nos. 3,717,686; 3,780,130 and 3,914,615, which are incorporated herein.

ILLUSTRATIVE EXAMPLE

The invention is further illustrated by the following detail of an operative entrainment unit, which was designed to protect a vacuum pump used in the system of Ser. Nos. 865,556 and 865,557 filed by Ore', Moore and Ellis on Dec. 29, 1977, and assigned to Occidental Research Corporation, the entire disclosures of which are hereby incorporated herein, from acid entrainment. The gas load through the system (design) was about 550 lbs/hr. of air, about 650 lbs/hr $CO_2$, saturated, plus acid entrainment from pondwater. Operating pressure was between 10 and 20 inches of mercury, absolute, temperature was 70°–105° F. The liquid drain was sealed into a hot well by a full vacuum leg.

Figure 5:
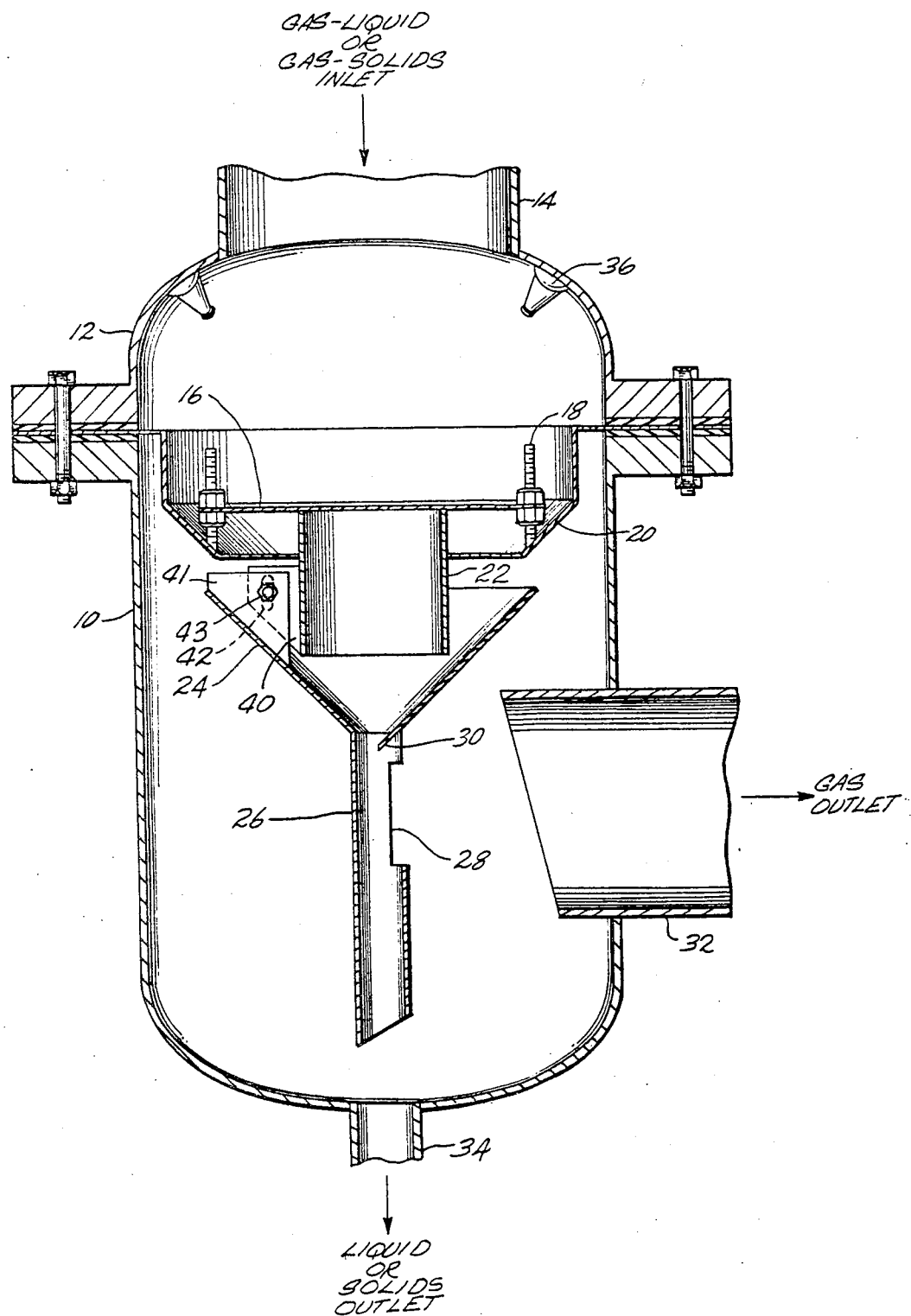

An entrainment separator as in FIG. 5 for separating liquids from gases was constructed having an overall height of 3 feet, 6⅜ inches and a diameter of 1 foot, 2 inches. The base portion of the housing for the separator was 2 feet, ⅜ inches in height. A removable cover 1 foot, 6 inches high fits on top of the base portion of the housing. The removable cover was fitted with means for securely fastening the cover onto the base portion of the housing.

An 8 inch diameter gas-liquid dispersion inlet was provided on top of the removable cover. Below the inlet was a 10 inch in diameter circular planar surface with one side thereof directed toward the inlet. The planar surface was positioned within the concave cavity created by an annular deflector. The annular deflector had an inward slope of 45° and had an opening at the bottom thereof of 9 inches in diameter. The planar surface was fitted with three adjustment means each including a bolt and two nuts, to position the planar surface above the annular deflector. By adjusting the nuts on the bolts, the planar surface could be raised or lowered.

Attached to the bottom side of the planar surface was a 4 inch in diameter tube, approximately 6 inches long. The tube was fastened perpendicular to the planar surface and extended downward therefrom toward a funnel. The funnel was attached to the tube such that a gap of from about ⅛ to about ¼ inches was formed between the tube and funnel. The funnel mouth had a 10 inches in diameter opening and narrowed to an outlet and spout of 1½ inches in diameter. The tube extended approximately 2½ inches down into the mouth of the funnel. The funnel had a downward slope of 45°. The spout on the funnel was 9 inches long and the tip of the spout was cut on a 30° bias. The spout was positioned over a 1½ inch diameter outlet, 4 inches long on the bottom of the separator.

Along the spout of the funnel was a gas port approximately ⅛ to ⅜ inches deep and 3 inches down the spout. Positioned over the gas port was a shield approximately 1 inch long and at a downward slope of 45°. Across from the gas port was a gas outlet 6 inches in diameter, and approximately 9 inches long at the top thereof and 7 inches long at the bottom, centered 13 inches up from the bottom of the separator and extending 6 inches from the side of the housing of the separator and extending about 3 inches at the top into the housing.

The plant entrainment separator was not inspected or adjusted after being received from the fabricator and placed in service. The plant was on stream for approximately 70 days. There was no sign of scale or corrosion in the separator and the only surprise was that the upper housing and inlet pipe were full of plastic saddles from the preceeding scrubber; apparently, something went wrong with the packing hold down grid. There was a small amount (about 2 cubic inches) of grit on the top plate and in the bottom of the separator which appeared to have come off the packing.

The vertical step down from the main support flange is a means to lower the bolts below the main flange to allow the top housing to be slid off sideways—a convenience for cleaning access. Access to the securing bolts for the lower funnel is difficult. The bolting lugs should come a little higher above the funnel. The top plate ("adjustable planar surface") should be of heavy gauge material so that it won't warp. Spacers should be fitted over the bolts under the planar surface, in place of the existing nuts, to give uniform adjustment of the planar surface. There were no problems with acidity in the vacuum pump seal water, which this equipment is designed to protect. In normal operation the flow of disengaged liquid from the separator was less than about 2 gallons per hour. However, in one instance, when the scrubber ahead of the separator was flooded, the flow of disengaged liquid from the separator was 12-24 gallons per hour and the vacuum pump remained adequately protected.

To convert this entrainment separator to a contactor-separator, a spray-boom can be installed above the adjustable surface (as illustrated in FIG. 1), thus permitting washing the gaseous stream with clean water (or other solvent or reagent) to further remove soluble materials from the gas.

What is claimed is:

1. A combination liquid-gas contactor and entrainment separator comprising:
   a. a housing having inlet means for introducing a flow of gas into said housing, first outlet means for withdrawing liquids and solids, separated from said gas, from said housing, and second outlet means for withdrawing gas, substantially free of entrained liquids and solids, from said housing, said inlet means and said first outlet means being disposed in opposite ends of said housing, said second outlet means being disposed in said housing intermediate said inlet and first outlet means;
   b. spray means for injecting a liquid mist into said housing, said spray means being configured and positioned for contacting said liquid mist with the gas introduced into the housing;
   c. a member having means defining a first surface for intercepting both the flow of gas introduced by the inlet means and the liquid mist injected by the spray means, and a second surface opposite said first surface;
   d. a tube disposed within said housing and extending away from said second surface;
   e. annular deflector means disposed adjacent to the member, attached to the housing and extending inward of the housing and positioned relative to the member to provide an opening therebetween; the deflector means being operative for directing the gas flow toward said tube;
   f. means for adjusting the position of the member relative to the annular deflector means, thereby varying the size of said opening; and,
   g. funnel means at least partly surrounding said tube for conducting flow of liquids and solids separated from the gas into said second outlet means.

2. The combination contactor-separator of claim 1 wherein the housing includes a removable cover with the inlet means disposed therein.

3. The combination contactor-separator of claim 1 further including means for securing the funnel means to the tube.

4. The combination contactor-separator of claim 3 wherein the means for securing the funnel means to the tube is further operative for regulating flow of the gas between said tube and funnel means by adjusting a spacing between the tube and the funnel means.

5. The combination contactor-separator of claim 1 wherein the funnel means is secured to the housing.

6. The combination contactor-separator of claim 1 wherein the funnel means includes a spout having a lateral gas port therein and said combination contactor-separator further comprises shield means, attached to the funnel, for preventing liquids or solids, separated from said gas, from flowing through the gas port.

7. The combination contactor-separator of claim 1 wherein the annular deflector means is attached to the housing and extends inwardly and downwardly of the housing at an angle of about 15° to about 75° relative to a longitudinal axis of said housing.

8. The combination contactor-separator of claim 1 wherein the annular deflector means is attached to the housing and extends inwardly and downwardly of the housing at an angle of about 30° to about 60° relative to a longitudinal axis of said housing.

9. The combination contactor-separator of claim 1 wherein the second outlet means includes a pipe extending through a housing sidewall and into the housing.

10. The combination contactor-separator of claim 1 further comprising means for washing collected liquids and solids from interior portions of the housing.

11. The combination contactor and entrainment separator of claim 1 wherein the spray means is further configured and disposed within said housing for injecting a liquid mist in a direction generally countercurrent to the direction of the flow of gas introduced by said inlet means.

12. The combination contactor and entrainment separator of claim 1 wherein the spray means is further configured and disposed within said housing for injecting a liquid mist in a direction generally co-current with the direction of the flow of gas introduced by said inlet means.

* * * * *